United States Patent
McColligan

(10) Patent No.: US 7,131,350 B2
(45) Date of Patent: Nov. 7, 2006

(54) BICYCLE STEM WITH STRESS REDUCING HANDLEBAR CLAMP

(75) Inventor: Michael McColligan, Calabasas, CA (US)

(73) Assignee: Jas. D. Easton, Inc., Van Nuys, CA (US)

( * ) Notice: Subject to any disclaimer, the term of this patent is extended or adjusted under 35 U.S.C. 154(b) by 301 days.

(21) Appl. No.: 10/400,129

(22) Filed: Mar. 25, 2003

(65) Prior Publication Data
US 2004/0187626 A1 Sep. 30, 2004

(51) Int. Cl.
*B62K 21/12* (2006.01)
(52) U.S. Cl. ............... 74/551.1; 403/290; 403/375
(58) Field of Classification Search ............... 74/551.1, 74/551.8; 403/11, 12, 109.4, 109.5, 110, 403/279, 290, 344, 362, 365, 373, 374.1, 403/374.2, 374.3, 375, 377, 383; 188/24; 280/88, 263, 264, 276, 279
See application file for complete search history.

(56) References Cited

U.S. PATENT DOCUMENTS

| 4,498,943 | A | * | 2/1985 | Itoh et al. ............... 156/164 |
| 4,526,491 | A | * | 7/1985 | Pawsat ..................... 403/24 |
| 5,019,140 | A | * | 5/1991 | Bowser et al. ............... 96/6 |
| 5,319,995 | A | * | 6/1994 | Huang ..................... 74/551.8 |
| 5,829,316 | A | * | 11/1998 | Krizman, Jr. ............ 74/551.8 |
| 6,003,405 | A | * | 12/1999 | Giard ..................... 74/551.3 |
| 6,035,741 | A | * | 3/2000 | Krizman, Jr. ............ 74/551.8 |
| 6,058,800 | A | * | 5/2000 | Giard ..................... 74/551.1 |
| 6,176,640 | B1 | * | 1/2001 | Gonczi ..................... 403/375 |
| 6,439,079 | B1 | * | 8/2002 | Kao ......................... 74/551.8 |
| 6,874,385 | B1 | * | 4/2005 | Alley ....................... 74/551.1 |

* cited by examiner

*Primary Examiner*—Chong H. Kim
(74) *Attorney, Agent, or Firm*—Roth & Goldman, P.A.

(57) ABSTRACT

A bicycle stem and front loading handlebar clamp having a pair of C-shaped cradles provided with handlebar contacting surfaces which have an edge to edge maximum extent in the direction of the handlebar greater than the inside diameter of the cradles and wherein the cradles are characterized by the absence of straight lines and sharp corners.. Handlebar clamping stress concentrations are reduced by the configuration of the contact surfaces and further by a configuration of a moveable one of the cradles somewhat in the form of a laterally elongated cross with smooth curves at the ends and at the corners of the cross.

12 Claims, 3 Drawing Sheets

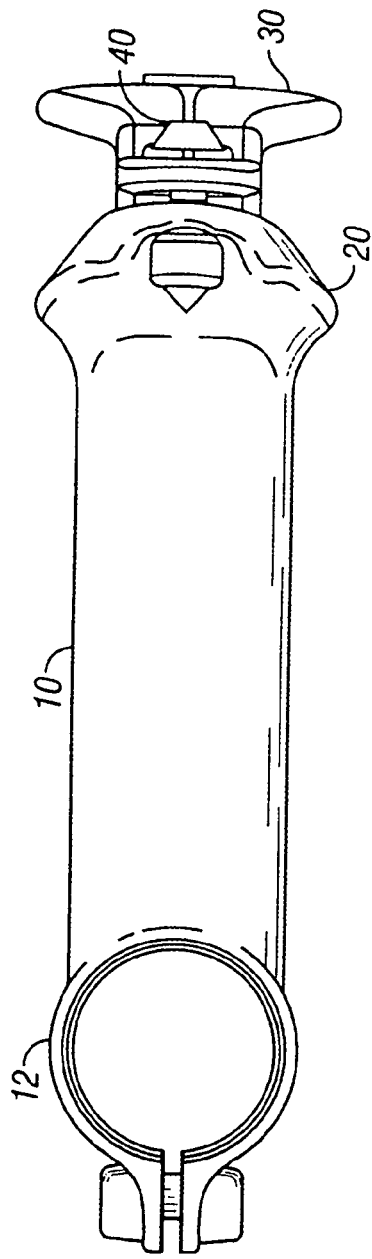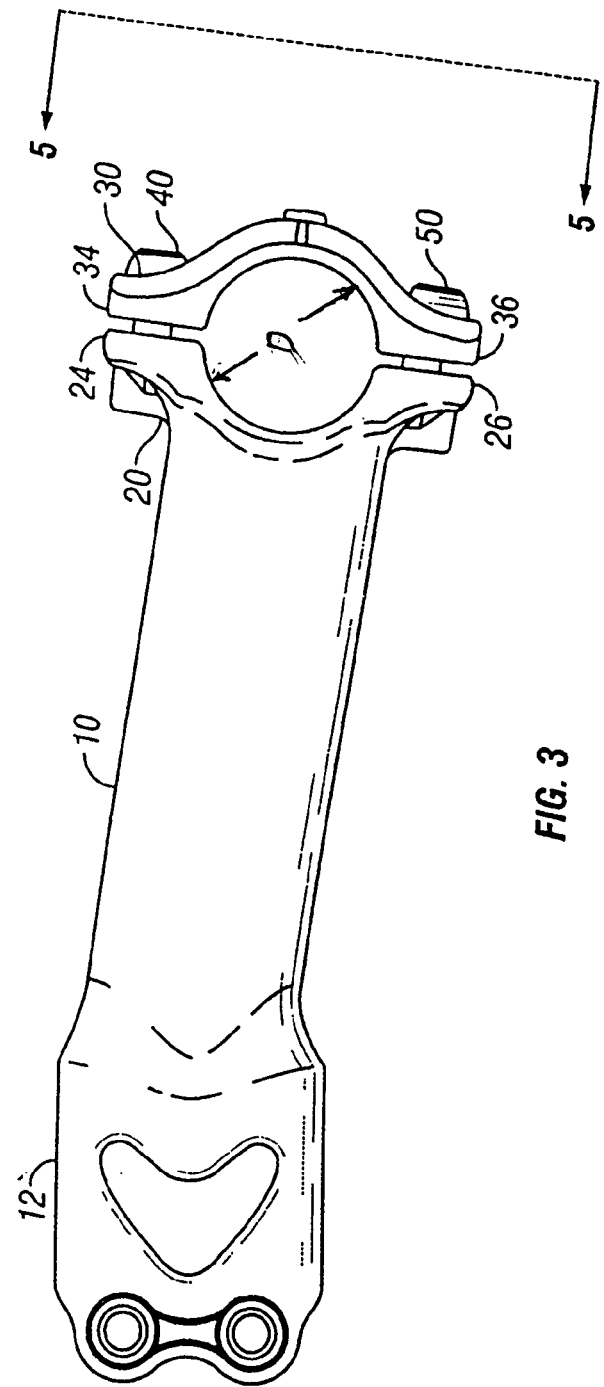
FIG. 2
FIG. 3

BICYCLE STEM WITH STRESS REDUCING HANDLEBAR CLAMP

CROSS REFERENCE TO RELATED APPLICATIONS, IF ANY

None

BACKGROUND OF THE INVENTION AND PRIOR ART

Field of the Invention

The present invention relates to parts for bicycles and other cycles, particularly lightweight bicycles for recreational riding, racing, mountain biking and off-road uses. As is known, cycles are steered by handlebars which in turn are connected to a steering tube which extends upwardly from the front wheel fork of the cycle. The connecting part is known as a stem and the stem may also include a forwardly extending boom to position the cycle handlebar at a desired location forwardly of the stem tube for comfort of the rider. Not all stems include booms, however. Various cycle parts including stems are usually manufactured from tubular metals such as alloys of aluminum, magnesium or steel and of composite materials such as carbon fiber reinforced resin.

Since reduction of weight is of extreme importance in human-powered cycles, increasing use has been made of very light weight but strong composite tubular structures instead of aluminum, titanium and steel tubular parts of cycle frames and handlebars. Such composites are relatively easily damaged not only cosmetically but also structurally by surface nicks and gouges such as are often incurred by clamping. The need therefore exists for a stem having a handlebar clamp to which a cycle handlebar made of composite material can be readily attached and removed for re-positioning or replacement without damaging the handlebar.

In general, the larger the clamping surface area which contacts the handlebar, the less clamping stress is transmitted from the clamping surfaces of the clamp to the handlebar.

OBJECTS OF PREFERRED EMBODIMENTS OF THE INVENTION

It is a primary object of the present invention to provide a stress reducing stem clamp in which a handlebar may be quickly and firmly attached without inducing significant clamping stress in the handlebar yet which will secure the handlebar by preventing relative rotation and longitudinal sliding movement of the handlebar.

Preferably, the stem clamp should also be readily attachable to cycle handlebars of various configurations including those having relatively short radius bends with little or no damage to the handlebar and without requiring removal of other components mounted on the handlebar such as hand grips, gear shifter controls and brake handles whenever field adjustment of the position of the handlebar is desired.

Various features and advantages of the invention will become apparent from reading the detailed description which follows.

SUMMARY OF THE INVENTION

The present invention provides a cycle stem comprising:
a) a tubular member having clamp structure thereon for attachment of the stem to the steering tube of a cycle; and
b) a handlebar clamp comprising a stationary C-shaped cradle integrally formed at one end of said tubular member, a moveable C-shaped cradle and means for fastening said cradles together, said cradles each having a handlebar contacting surface having a maximum dimension along an axially extending clamping length of a handlebar greater than an inside diameter of said cradles and wherein said cradles are characterized by the absence of straight lines and sharp corners.

BRIEF DESCRIPTION OF THE DRAWINGS

FIG. 2 is a plan view of the stem and clamp shown in FIG. 1.

FIG. 3 is a side elevation view of the stem and clamp shown in FIG. 1.

DESCRIPTION OF THE PREFERRED EMBODIMENT

Figure 1:
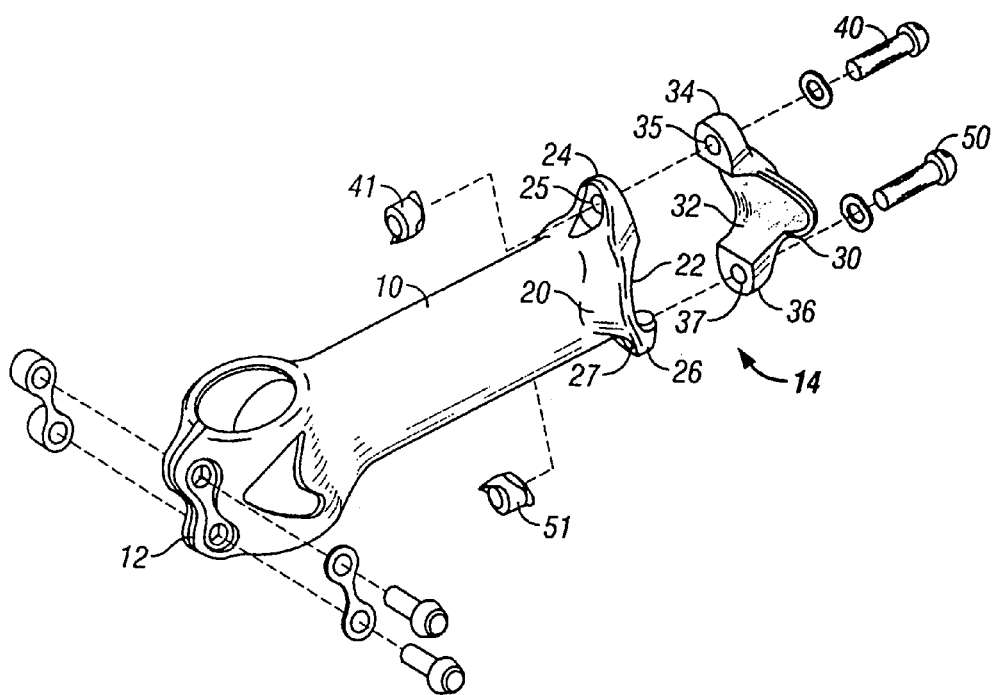
FIG. 1 is an exploded perspective view of one preferred embodiment of a stem and handlebar clamp according to the present invention.

In its broadest aspects, the cycle stem is comprised of a stem tube 10 which, in this embodiment includes a boom which, in use extends generally forwardly of the rider. The stem tube 10 has clamps 12, 14 at each end respectively for attaching the stem to a generally vertically extending steering tube of a cycle and to a handlebar. The stem tube 10 include a generally straight boom, as shown, but stems of other configurations are well known and well with in the scope of the present invention. The preferred embodiment of the invention shown in FIG. 1 includes an elongated boom which extends forwardly and slightly downwardly although it will be appreciated at the angle of inclination, if any, of the boom between the steering tube clamp 12 and handlebar clamp 14 can be varied if desired. The manner in which the stem tube 10 is attached to the steering tube is not necessary to and forms no part of the present invention.

At the front end of the stem tube 10 (as viewed when sitting on a bicycle) a handlebar clamp 14 which opens to the front is provided. The handlebar clamp 14 is comprised of a stationary C-shaped cradle 20 and a moveable C-shaped cradle 30 connected by two threaded fasteners 40, 50 including nuts 41, 51, to the stationary C-shaped cradle 20. The handlebar clamp 14 preferably has a generally circular handlebar receiving cross-section at this location as seen if FIG. 3. Oval and other cross-sectional configurations such as hexagonal, octagonal, etc. are also within the scope of the invention as defined by the wording of the attached claims. The wall thickness of the stem tube 10 or boom is ordinarily substantially constant between the clamps 12, 14, although this too is not essential.

It will be noted that the inner clamping surfaces 22, 32 of the C-shaped cradles 20, 30 are cylindrical as shown and extend for approximately 180° each to provide almost a full 360° contact around a handlebar when clamped therein.

The clamp assembly is completed by the fasteners 40, 50 preferably comprising threaded nuts and bolts received in apertures in opposed ears 24, 26; 34, 36 integrally formed on the stationary and moveable cradles 20, 30. The apertures and fasteners are preferably centered in a vertical plane containing the axis of the stem tube clamp 12.

Minimization of stresses in bicycle handlebars of composite construction is a primary safety concern, particularly for bicycles used in rigorous activities such as racing and off-road use since structural failure of bicycle handlebars may result in substantial injury and even death. Also, modern high tech handlebars made of composite materials to reduce weight and increase strength are usually expensive. Handlebar failure may be experienced, but not necessarily noticed, when the handlebar is improperly clamped into the stem too tightly or without due care taken to repeatedly alternate the tightening of the fasteners. Failure is also occasionally experienced during use and may be caused by a combination of dead load or stem bolt stresses induced by improper clamping and live load stresses induced due to strenuous riding which exceed the safety factor for the handlebar design. Other factors believed to contribute to handlebar failure include material fatigue and deterioration due to aging and long term exposure of the composite materials used in the handlebar to environmental conditions such as smog or acid rain, freezing, high temperature exposure and the like.

Figure 4:
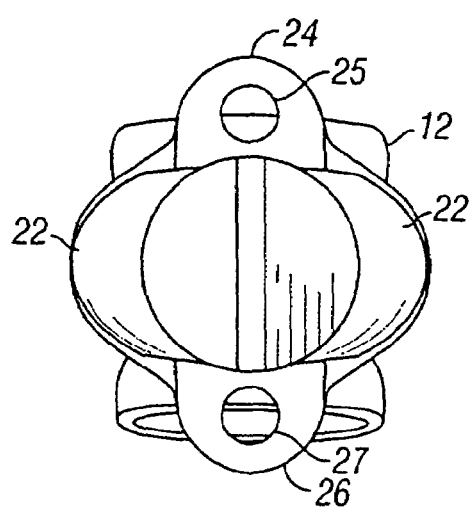
FIG. 4 is a front elevation view of the stem shown in FIG. 1.
Figure 5:
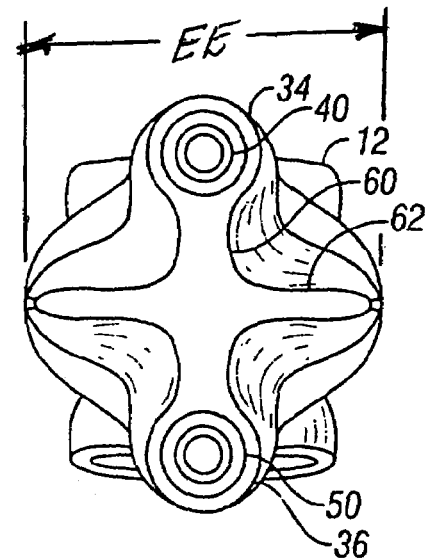
FIG. 5 is a front elevation view of the stem with the moveable clamp attached.

The stem and handlebar clamp described above is specially configured and designed to reduce stress concentrations in bicycle handlebars, particularly those made of composite materials, at all locations where the clamp surfaces engage the handlebar and may generally be characterized by the elimination of sharp edges and corners at the boundaries of the handlebar contact areas. Due to the higher design strength and materials of which the stem and C-shaped cradles 20, 30 are manufactured as compared with the design strength of the handlebar, failure of the stem tube 10, cradles 20, 30 and fasteners 40, 50 is relatively unlikely. Accordingly, the cradles 20, 30 each are designed to have large handlebar contacting surfaces 22, 32. The cradles 20, 30 have maximum edge to edge dimensions E—E as seen in FIG. 5 which extend axially of the handlebar (horizontally as shown) a distance greater than the inside diameter of the cradles as best seen in FIG. 3. Also, the total area of the handlebar contacting surfaces 22 on the stationary cradle 20 (FIG. 4) is preferably greater than the wall area seen in a transverse cross section of the stem tube 10 by a factor of about 3 due to the purposely flared configuration of the surfaces 22 of the cradle 20. The area of the handlebar contacting surface 32 of the moveable cradle 30 (see FIG. 1) is significantly greater than, and preferably at least twice as large as, the area of the handlebar contacting surface 22 on the stationary cradle 20.

The opposed upper and lower ears 24, 26; 34, 36 on the stationary and moveable cradles 20, 30 include apertures 25, 27, 35, 37 through which the threaded fasteners 40, 50 extend and the ears 24, 34 and 26, 36 abut each other along an axial radial plane through the connecting area of the handlebar and are all centered on a line, (substantially vertical as seen in FIG. 5 and which may be slightly angled from vertical as seen in the depicted embodiment in FIG. 3) transverse to the central portion of the handlebar received in the cradles 20, 30. The ears 24, 26; 34, 36 on the stem tube 10 and the stationary cradle 20 are all shaped to smoothly transition in gradual curves to merge with the outside arcuate surface of the stem tube 10. The moveable cradle 30, as viewed in FIG. 5, can be loosely described as a laterally elongated cross with arms each having smooth curves at their ends and at the corners of the arms. Integrally formed centrally extending reinforcing ribs 60, 62 on the outer surfaces of the arms provide greater thickness and strength in these areas. Finally, the sides of the ears 24, 26 on the outside of the stationary cradle 20 which face the stem tube 10 are recessed with non-circular configuration as best seen in FIG. 1 to receive fastener nuts 41, 51 of complementary non-circular configuration into which the bolts of the fasteners 40, 50 are threaded.

Figure 6:
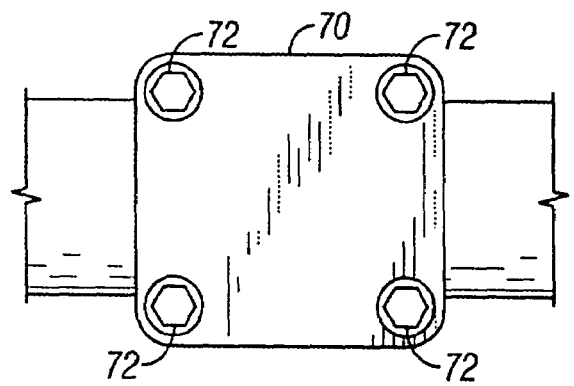
FIG. 6 is a front elevation view of a first form of prior art handlebar clamp.
Figure 7:
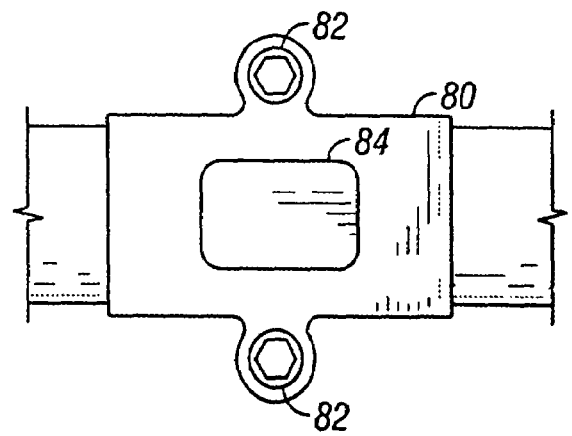
FIG. 7 is a front elevation view of a second form of prior art handlebar clamp.

To test the effectiveness of the stem configuration described and shown, five carbon reinforced resin composite handlebars of CE90 material from Easton Sports, Inc. of Van Nuys, Calif. were clamped in stem clamps of three different types (a total of 15 handlebars were consumed in the tests), respectively comprising (1) a four bolt magnesium clamp of EM90 material from Easton Sports, Inc. having two curved cradles each formed from a rectangular generally square plate 70 having curved corners and four fasteners 72 as shown in FIG. 6; (2) a two bolt aluminum clamp of EA50 material, also from Easton Sports, Inc., having two curved cradles each formed from a rectangular plate 80 with two fasteners 82 and a central rectangular aperture 84 as shown in FIG. 7; and (3) a two bolt aluminum clamp of EA 70 material configured as shown in FIGS. 1–5. In each test, the clamp connecting bolts were tightened in 5 pound increments until handlebar cracking was audibly or visually detected. The first clamp configuration resulted in handlebar cracking at an average of 61 inch pounds of torque. The second clamp configuration resulted in handlebar cracking at an average of 109 inch pounds of torque. The third clamp configuration resulted in handlebar cracking at an average of 163 inch pounds of torque—approximately a 50% increase compared to the next best second clamp configuration. Since all cracking occurred in the handlebars rather than in the clamps, the improvement is considered attributable solely to the new configuration of clamp parts rather than to differences in materials of which the clamps are made. Although a maximum bolt tightening torque of 70 inch pounds is generally recommended by the manufacturer, handlebars are usually not installed by the manufacturer and the consumer typically does not use a torque wrench or follow the manufacturer's instructions when attaching a handlebar to a stem, particularly in the field. For this reason, and due to the severe potential consequences of handlebar failure during riding, a high factor of safety is dictated and made possible by the present invention.

Persons skilled in the art will readily appreciate that various changes and modifications of an obvious nature can be made and all such changes and modifications are considered to fall within the scope of the appended claims.

The invention claimed is:

1. A cycle stem comprising:
   a) a tubular member having an axis and clamp structure thereon for attachment of the stem to the steering tube of a cycle; and
   b) a handlebar clamp comprising a stationary C-shaped cradle integrally formed at one end of said tubular member, a moveable C-shaped cradle and means for fastening said cradles together, said cradles each having a handlebar contacting surface having a maximum dimension along an axially extending clamping length of a handlebar greater than an inside diameter of said cradles and wherein axially spaced boundaries of said handlebar contacting surfaces of said cradles, when projected onto a plane which extends axially of said tubular member and axially of said handlebar, are characterized by lines which first converge from laterally outermost edges of said stationary cradle and then diverge to laterally outermost edges of said moveable cradle, said boundaries also being characterized by the absence of sharp corners.

2. The stem of claim 1, wherein said handlebar contacting surface on said stationary cradle is of greater area than the cross sectional area of said tubular member by a factor of about 3.

3. The stem of claim 2, wherein said handlebar contacting surface on said moveable cradle is at least twice as large as the area of said handlebar contacting surface on said stationary cradle.

4. The stem of claim 1, wherein said means for fastening comprises two threaded fasteners.

5. The stem of claim 4, wherein said tubular member has integrally formed ears through which said fasteners extend, said ears being positioned on a line transverse to said maximum dimension.

6. The stem of claim 5, wherein said moveable cradle has a maximum axial dimension substantially the same as the maximum axial dimension of said stationary cradle.

7. The stem of claim 6, wherein said ears and said maximum dimension of said stationary cradle smoothly transition in curves to an outside arcuate surface of said tubular member.

8. The stem of claim 7, wherein said ears on said stationary cradle abut ears on said moveable cradle along an axial radial plane.

9. The stem of claim 8, wherein said moveable cradle is a laterally elongated cross having crossed arms each having smooth curves at ends of said arms and at corners of said arms.

10. The stem of claim 9, wherein said arms each include centrally extending reinforcing ribs.

11. The stem of claim 9, wherein said means for fastening each comprise a nut and bolt.

12. The stem of claim 10, wherein said nuts are of non-circular configuration and said ears on said stationary cradle include seats of non-circular configuration for reception of said nuts.

* * * * *